US012789345B2

(12) United States Patent
Davis et al.

(10) Patent No.: US 12,789,345 B2
(45) Date of Patent: Nov. 10, 2026

(54) SYSTEMS AND METHODS FOR AUTOMATICALLY ADJUSTING A POWER TOOL SETTING BASED ON POWER TOOL DEVICE POSITIONING RELATIVE TO A WORK OBJECT

(71) Applicant: Milwaukee Electric Tool Corporation, Brookfield, WI (US)

(72) Inventors: Anthony M. Davis, Brookfield, WI (US); Chris J. Burkhardt, Brookfield, WI (US); Steven M. Stefanik, Brookfield, WI (US); Jeremy R. Ebner, East Troy, WI (US); Chad E. Jones, Jackson, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 278 days.

(21) Appl. No.: 18/690,249

(22) PCT Filed: Sep. 9, 2022

(86) PCT No.: PCT/US2022/043120
§ 371 (c)(1),
(2) Date: Mar. 7, 2024

(87) PCT Pub. No.: WO2023/039200
PCT Pub. Date: Mar. 16, 2023

(65) Prior Publication Data

US 2025/0135622 A1 May 1, 2025

Related U.S. Application Data

(60) Provisional application No. 63/242,739, filed on Sep. 10, 2021.

(51) Int. Cl.
*B25F 5/00* (2006.01)
*B25B 23/142* (2006.01)
*G06F 16/955* (2019.01)

(52) U.S. Cl.
CPC ............ *B25F 5/00* (2013.01); *B25B 23/1425* (2013.01); *G06F 16/9554* (2019.01)

(58) Field of Classification Search
CPC .... B25F 5/00; G06F 16/9554; B25V 23/0425
See application file for complete search history.

(56) References Cited

U.S. PATENT DOCUMENTS 6,260,427 B1 7/2001 Jones et al.
8,676,368 B2 * 3/2014 Stencel .................. B25B 23/14 702/182

(Continued)

FOREIGN PATENT DOCUMENTS

DE 102019131627 A1 5/2021
DE 102020205165 A1 10/2021

(Continued)

*Primary Examiner* — Michelle Lopez
(74) *Attorney, Agent, or Firm* — Quarles & Brady LLP

(57) ABSTRACT

One or more settings of a power tool device can be automatically adjusted based on a location of the power tool device relative to a work object. Work object data that indicate a work object type for the work object can be determined, and work location data can be determined based on the work object data. The work location data indicate work locations on the work object where a power tool device action is to be performed. A position of the power tool device is also determined. An electronic controller can determine a power tool device setting corresponding to the power tool device action to be performed at the work location nearest to the power tool device position. The power tool device setting is transmitted to the power tool device by the electronic controller, where the power tool device setting indicates an operating parameter of the power tool device.

22 Claims, 5 Drawing Sheets

(56) References Cited

U.S. PATENT DOCUMENTS 9,533,403 B2 * 1/2017 Lee ........................ B25B 23/14
10,850,374 B2 * 12/2020 Pineau ............... G05B 19/4061
11,103,980 B2 * 8/2021 Tang ................... B25B 23/1456
11,366,457 B1 6/2022 George et al.
2003/0037423 A1 2/2003 Siegel
2005/0167130 A1 8/2005 Setter et al.
2006/0289183 A1 12/2006 Schreiber
2008/0021590 A1 1/2008 Vanko et al.
2010/0114358 A1 5/2010 Krapf et al.
2011/0093110 A1 4/2011 Stencel et al.
2013/0187587 A1 7/2013 Knight et al.
2013/0327552 A1 12/2013 Lovelass et al.
2014/0240125 A1 * 8/2014 Burch ...................... B25H 3/02 340/539.13
2014/0338939 A1 11/2014 Shi
2014/0367134 A1 12/2014 Phillips et al.
2015/0045929 A1 * 2/2015 Lee ........................ B23P 19/06 700/114
2015/0101835 A1 4/2015 Nitsche et al.
2015/0178620 A1 6/2015 Ascari et al.
2016/0000025 A1 1/2016 Hamann et al.
2016/0342142 A1 11/2016 Boeck et al.
2016/0361069 A1 12/2016 Ardel et al.
2016/0375570 A1 12/2016 Boeck et al.
2017/0090430 A1 3/2017 Nakazawa
2018/0328797 A1 11/2018 Gwon et al.
2019/0187659 A1 6/2019 Li et al.
2019/0222957 A1 * 7/2019 Burch ...................... B25H 3/02
2019/0227528 A1 * 7/2019 Abbott ................... G06N 20/00
2020/0156210 A1 5/2020 Sullivan et al.
2020/0160152 A1 5/2020 Buttner et al.
2020/0267903 A1 8/2020 Gao et al.
2020/0276680 A1 9/2020 Green et al.
2020/0276682 A1 9/2020 Geissler et al.
2020/0326718 A1 10/2020 Kandemir et al.
2020/0338677 A1 10/2020 Ozeki
2020/0384618 A1 12/2020 Tanji et al.
2020/0400525 A1 * 12/2020 King ..................... G01L 25/003
2021/0016894 A1 1/2021 Childress
2021/0053212 A1 2/2021 Haetty
2021/0101263 A1 * 4/2021 Hwang .................. G06V 10/32
2021/0101304 A1 4/2021 Green et al.
2021/0104006 A1 4/2021 Green
2021/0116894 A1 4/2021 Wichern et al.
2021/0157297 A1 5/2021 Kaiser et al.
2021/0166154 A1 6/2021 Ogino
2021/0192386 A1 6/2021 Cabrita et al.
2021/0205976 A1 7/2021 Matei
2021/0240145 A1 8/2021 Abbott
2021/0248283 A1 * 8/2021 Kincart ................... G06T 17/05
2021/0302921 A1 9/2021 Kolter et al.
2021/0312262 A1 10/2021 Postel
2021/0326663 A1 10/2021 Winston et al.
2021/0374549 A1 12/2021 Willmott et al.
2021/0383234 A1 12/2021 Bai et al.
2021/0393337 A1 12/2021 Zucker
2021/0394344 A1 12/2021 Mueckl et al.
2022/0019900 A1 1/2022 Wong et al.
2022/0050023 A1 2/2022 Lavazais et al.
2022/0067913 A1 3/2022 Lutz et al.
2022/0092466 A1 3/2022 Carbrita et al.
2022/0100850 A1 3/2022 Sun et al.
2022/0101116 A1 3/2022 Sheikholeslami et al.
2022/0101143 A1 3/2022 Rice et al.
2022/0108132 A1 4/2022 Zhang et al.
2022/0111496 A1 4/2022 Beacham, Jr. et al.
2022/0118595 A1 4/2022 Abbott et al.
2022/0121177 A1 4/2022 Kerwin
2022/0138510 A1 5/2022 Dai et al.
2022/0138511 A1 5/2022 Xu et al.
2022/0172061 A1 6/2022 Willmott et al.
2022/0197227 A1 6/2022 Woehlke et al.
2022/0261618 A1 8/2022 Garcia et al.
2022/0266429 A1 8/2022 Erbele et al.
2022/0292349 A1 9/2022 Stoll et al.
2022/0299946 A1 9/2022 Abbott et al.
2022/0313374 A1 10/2022 Jacobsen et al.
2022/0318616 A1 10/2022 Kamble et al.
2022/0347811 A1 11/2022 Abbott et al.
2022/0405648 A1 12/2022 Lin et al.
2022/0407274 A1 12/2022 Radtke et al.
2022/0410360 A1 12/2022 Erbele et al.
2023/0039379 A1 2/2023 Schmidt
2023/0057100 A1 2/2023 Schirmer et al.
2023/0100132 A1 3/2023 Rice et al.
2023/0100765 A1 3/2023 Roderick et al.
2023/0101812 A1 3/2023 Feng et al.
2023/0102866 A1 3/2023 Bai et al.
2023/0107463 A1 4/2023 Baharloui et al.
2023/0107917 A1 4/2023 Pabbaraju et al.
2023/0115313 A1 4/2023 Weber et al.
2023/0115521 A1 4/2023 Kupcsik et al.
2023/0141816 A1 5/2023 Butzerin et al.
2023/0219204 A1 7/2023 Dieter et al.
2023/0251614 A1 8/2023 Lutz et al.
2023/0298315 A1 9/2023 Sheikholeslami et al.
2023/0316067 A1 10/2023 Rudolph et al.
2023/0321796 A1 10/2023 Speckman et al.
2023/0339142 A1 10/2023 Mayer et al.
2023/0356341 A1 11/2023 Volpert
2023/0367269 A1 11/2023 Glennon et al.
2023/0406344 A1 12/2023 Jiang et al.
2024/0020638 A1 1/2024 Adcock et al.
2024/0037282 A1 2/2024 Rice et al.
2024/0037446 A1 2/2024 Vogt et al.
2024/0051107 A1 2/2024 Petersson et al.
2024/0070451 A1 2/2024 Zhang et al.
2024/0096067 A1 3/2024 Mahmud et al.
2024/0104339 A1 3/2024 Norouzzadeh et al.
2024/0112455 A1 4/2024 He et al.
2024/0198475 A1 6/2024 Bralla et al.
2024/0198506 A1 6/2024 Leray et al.
2024/0217082 A1 7/2024 Abbott et al.
2024/0347286 A1 10/2024 Abbott et al.
2024/0367296 A1 11/2024 Nakamura et al.

FOREIGN PATENT DOCUMENTS

DE 102020213080 A1 4/2022
EP 1398119 A1 3/2004
EP 3623108 A1 3/2020
EP 3716160 A1 9/2020
EP 3770820 A1 1/2021
EP 3772398 A1 2/2021
EP 3913547 A1 11/2021
EP 3950230 A1 2/2022
EP 4357983 A1 4/2024
JP 2012-200807 A 10/2012
JP 2022-153183 A 10/2022
KR 10-1847511 B1 4/2018
WO 2009/138268 A1 11/2009
WO 2017/162130 A1 9/2017
WO 2020/073955 A1 4/2020
WO 2021/042233 A1 3/2021
WO 2021/060090 A1 4/2021
WO 2021/241111 A1 12/2021
WO 2023/000659 A1 1/2023
WO 2023/076385 A2 5/2023
WO 2023/076953 A1 5/2023
WO 2023/076954 A1 5/2023
WO 2023/076955 A1 5/2023
WO 2023/110231 A1 6/2023
WO 2023/180247 A1 9/2023
WO 2023/186501 A1 10/2023
WO 2023/217792 A1 11/2023
WO 2023/222382 A1 11/2023
WO 2024/044660 A1 2/2024

* cited by examiner

SYSTEMS AND METHODS FOR AUTOMATICALLY ADJUSTING A POWER TOOL SETTING BASED ON POWER TOOL DEVICE POSITIONING RELATIVE TO A WORK OBJECT

RELATED APPLICATIONS

The present application is based on and claims priority from U.S. Patent Application No. 63/242,739, filed on Sep. 10, 2021, the entire disclosure of which is incorporated herein by reference.

BACKGROUND

Work tools (e.g., power tools) allow operators to implement various functionalities on many different components (e.g., fasteners, electrical wires, power cables, sheet metal, etc.). For example, some power tools can include a rotary head that is driven (e.g., pneumatically, hydraulically, electrically) to tighten or loosen a fastener. As another example, some power tools can include a cutting head that is driven (e.g., hydraulically, or electrically) into a component, such as a power wire, to cut through the component.

SUMMARY

Some embodiments of the disclosure provide a method for adjusting a power tool device setting of a power tool device based on a location of the power tool device relative to a work object. The method includes determining work object data that indicate a work object type for the work object. Work location data based on the work object data are also determined. The work location data indicate work locations on the work object where a power tool device action is to be performed. A power tool device position of the power tool device is also determined. The method also includes determining, by an electronic controller, a power tool device setting corresponding to the power tool device action to be performed at the work location nearest to the power tool device position. The power tool device setting is transmitted to the power tool device by the electronic controller, where the power tool device setting indicates an operating parameter of the power tool device.

Some embodiments provide a wireless communication device. The wireless communication device includes a transceiver and an electronic controller in communication with the transceiver. The electronic controller includes a processor and a memory. The memory has stored thereon work location data indicating work locations on each type of work object where a power tool device action is to be performed, power tool device setting data indicating a power tool device setting for each work location in the work location data. The processor is configured to: determine work object data that indicate a work object type for a work object located at a jobsite; retrieve the work location data stored in the memory corresponding to the type of work object indicated in the work object data; retrieve power tool device setting data stored in the memory corresponding to the work locations indicated in the work location data retrieved by the processor; determine a power tool device position of a power tool device located at the jobsite; and transmit to the power tool device, by the transceiver, a power tool device setting corresponding to the power tool device action to be performed at the work location in the work location data that is nearest to the power tool device position determined by the processor.

Some embodiments provide a power tool. The power tool includes a body, an actuator coupled to the body, a transceiver coupled to the body, and an electronic controller coupled to the body and in communication with the antenna. The electronic controller includes a processor configured to: determine a position of the power tool relative to a work object; transmit the position of the power tool to a wireless communication device; receive, in response to the position of the power tool, a power tool device setting from the wireless communication device, where the power tool device setting indicates a setting for the actuator to perform a power tool device action at a work location on the work object determined by the position of the power tool relative to the work object.

BRIEF DESCRIPTION OF THE DRAWINGS

The accompanying drawings, which are incorporated in and form a part of this specification, illustrate embodiments of the disclosure and, together with the description, serve to explain principles of the embodiments.

DETAILED DESCRIPTION

Figure 1:
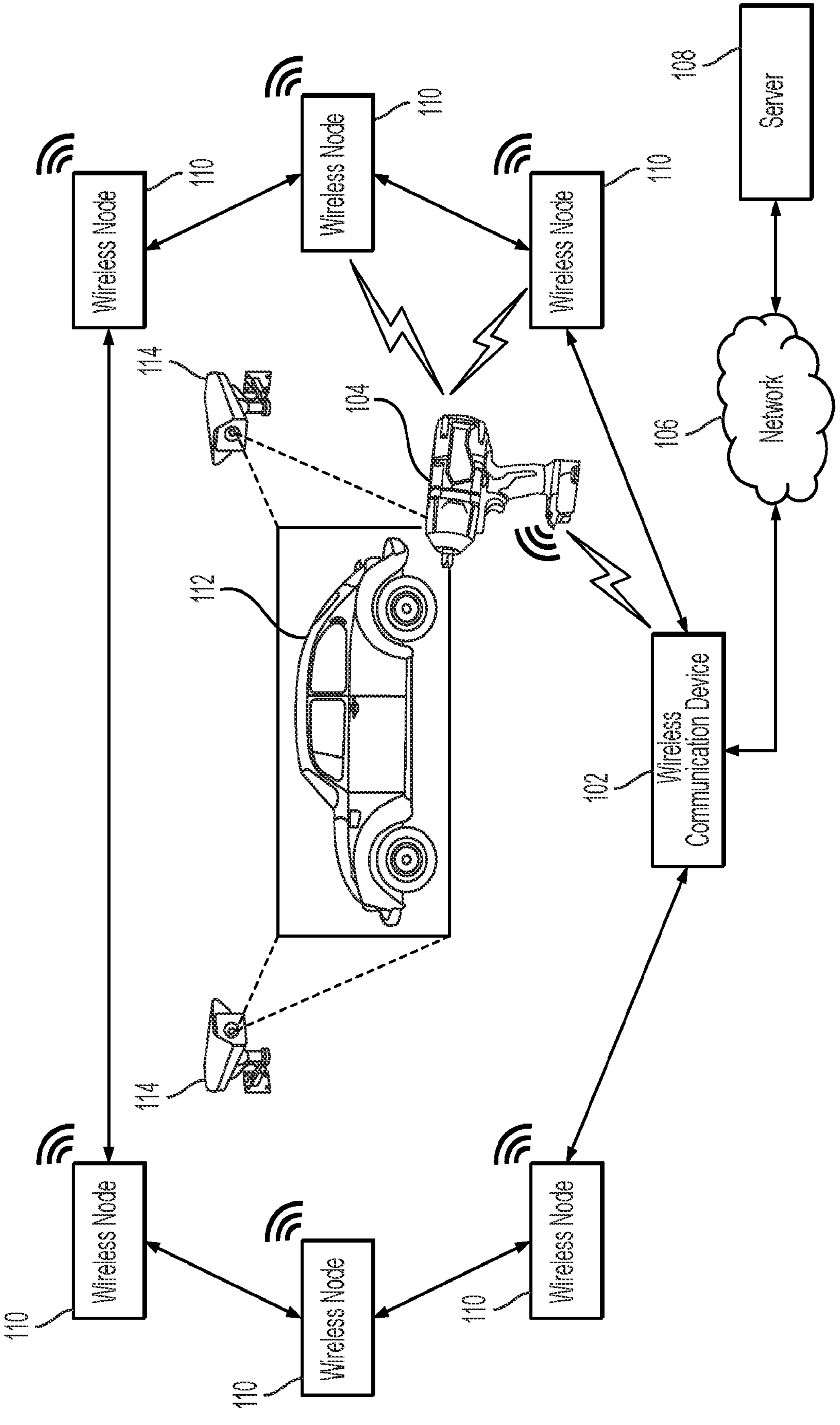
FIG. 1 is a schematic illustration of a power tool system that can implement a work object recognition, power tool device position tracking, and automatic power tool device setting adjustment system.

As described above, power tools generally can implement various functionalities on different components. For example, power tools generally can include an actuator including a moveable component that when moved into contact with the component, implements some kind of functionality on the component. For example, such as when the power tool is implemented as a fastener tool, the actuator of the fastener tool can include a rotary head that, when moved into contact with a work piece (e.g., a fastener to be driven), can rotate the fastener to mechanically join or couple two or more objects together. As another example, such as when the power tool is implemented as a cutting tool, the actuator of the cutting tool can include a cutting head that, when moved into contact with a work piece (e.g., a wire to be cut), can sever the work piece in two. As still another example, such as when the power tool is implemented as a crimping tool, the actuator of the crimping tool can include a crimping head that, when moved into contact with a work piece (e.g., a wire to be crimped), can crimp the work piece (e.g., to create an electrical connection to the wire).

Some power tools can include an electronic controller that can control various features of the tool (e.g., via one or more operating parameters or power tool settings). For example, the electronic controller can drive extension (or rotation) of the actuator to implement a functionality on a work piece, or can drive retraction (or rotation in the opposing direction) of the actuator (e.g., after the functionality has been completed). In some embodiments, the electronic controller of the power tool can receive data from sensors of the power tool, which can augment the control of the actuator. For example, one sensor can be a trigger that is coupled to the power tool, which when actuated (e.g., by an operator), causes the actuator to extend to implement the functionality (e.g., via the electronic controller).

In some cases, one or more power tools are used to perform common tool actions on the same type of work object. For example, an impact wrench may be used in assembly, repair, or maintenance tasks to tighten and/or loosening fasteners on work objects such as vehicles (e.g., automotive, heavy equipment) or machine tools. In these instances, a user of the impact wrench will often perform the same tool action many times on the same type of work object. For example, in an automotive repair shop, a user may use an impact wrench to tighten and/or loosen lug nuts on a wheel, or to tighten and/or loosen an oil pan bolt. As the user performs work on the work object, the power tool settings of the power tool (e.g., torque settings) must be changed as the user moves between work locations (e.g., lug nuts on the wheels versus oil pan bolt). Traditionally, the power tool settings must be changed manually by the user, which may result in unsafe operation (e.g., by requiring a user to remove a hand from a power tool in order to make a change of the power tool settings). Additionally or alternatively, manually changing the power tool settings may result in the incorrect setting being selected for a particular work task, which may result in damage to the power tool and/or work object, in addition to an inaccurate completion of the work task. For example, the user may select an incorrect torque setting for an impact wrench, which may result in overtightening and/or stripping of a fastener.

In some cases, a wireless communication device can be in direct communication (e.g., wirelessly) with each power tool at a jobsite, and thus the wireless communication device can automatically adjust the power tool settings of each power tool, based on each power tool directly communicating with the wireless communication device (e.g., the wireless communication device receiving an identification for each power tool). However, the appropriate power tool settings for the power tool, the work object, and the tool action to be performed at each work location on the work object must be determined before the power tool settings can be automatically adjusted for the power tool. Thus, even though power tools are in communication with the wireless communication device, a user will still need to select the appropriate power tool setting for adjusting the power tool's operation.

Some embodiments described herein provide solutions to these problems (and others) by providing improved systems and methods for automatically adjusting a power tool device setting based on the power tool device's location relative to a work location on a work object. For example, some embodiments of the disclosure provide systems and methods for automatically adjusting a power tool device setting of an impact wrench, such as a torque setting, based on the location of the impact wrench relative to a work location on a work object, such as an oil pan on a vehicle being serviced.

For example, some embodiments of the disclosure provide a power tool system that can include a wireless communication device and/or wireless nodes in communication with one or more power tool devices on a jobsite at which a work object is located. The wireless communication device and/or wireless nodes can communicate with one of the power tool devices to track a position of the power tool device relative to the position of the work object. By determining the type of work object being worked on, and the common work locations at which a tool action is to be performed on that work object, the wireless communication device and/or wireless nodes can communicate updated power tool device settings to the power tool device as the power tool device is moved to different work locations on the work object. In this way, power tool device settings can be automatically disseminated to the power tool device through the wireless communication device and wireless nodes (which may be, for example, a mesh network). Thus, operating parameters of the power tool device can be automatically adjusted without interrupting the user's work on the work object. As such, work object detection, power tool device position tracking, and automatic power tool device setting adjustment facilitated by the wireless communication device and/or wireless nodes can considerably reduce incorrect power tool settings and increase jobsite throughput.

In some embodiments, each power tool device of the power tool system can include one or more transceivers and/or antennas (e.g., as part of one or more Bluetooth® wireless modules, one or more Zigbee® wireless modules) that are capable of communicating with other devices (e.g., other power tool devices and/or wireless communication devices) according to a wireless protocol (e.g., a Bluetooth® wireless protocol, which can have advantages as compared to other wireless protocols, such as by using less power to communicate, providing fast communication speeds, ensuring one-to-one pairing between devices at some times, etc.). Thus, in some cases, a mesh network of power tool devices, wireless communication devices, and/or wireless nodes can be a Bluetooth® mesh network, a Zigbee® mesh network, or the like.

FIG. 1 shows a schematic illustration of a power tool system 100, which may implement a work object recognition, power tool device positioning, and automatic power tool device setting adjustment system. The power tool system 100 can include a wireless communication device 102, one or more power tool devices 104, a network 106, a server 108, and one or more wireless nodes 110.

The power tool system 100 is capable of determining the position of a work object 112 and the power tool device(s) 104 within a frame of reference, which may be a frame of reference defined, for example, by the wireless communication device 102 and/or wireless nodes 110, a fixed reference location at a jobsite, or the like. Additionally, the power tool system 100 is capable of determining work object data indicative of the work object 112. For example, the work object data may include the type of work object, the size or other dimensions of the work object, one or more work locations corresponding to locations on the work object 112 where a power tool device action is to be performed, and the like.

In some embodiments, the work object position and work object data can be determined based on images of the work object 112, which may be recorded by one or more cameras 114 located at the jobsite. In some instances, the locations of the one or more cameras 114 may be fixed and may define, in whole or in part, the frame of reference within which the work object and power tool device position are defined.

The wireless communication device 102 can be configured to directly (and indirectly) communicate with the power tool device(s) 104. For example, the power tool device 104 can directly communicate with the wireless communication device 102 (e.g., the wireless communication device 102 and the power tool device 104 can directly transmit and receive wireless signals therebetween). In other instances, the power tool device 104 can indirectly communicate with the wireless communication device 102 via one or more wireless nodes 110.

In some embodiments, the wireless communication device 102 can be implemented in different ways. For example, the wireless communication device 102 can include components such as a processor, memory, a display, inputs (e.g., a keyboard, a mouse, a graphical user interface, a touch-screen display, one or more actuatable buttons, etc.), communication devices (e.g., an antenna and appropriate corresponding circuitry), etc. In some embodiments, the wireless communication device 102 can simply be implemented as a processor. In some specific embodiments, the wireless communication device 102 can be implemented as a mobile phone (e.g., a smart phone), a personal digital assistant ("PDA"), a laptop, a notebook, a netbook computer, a tablet computing device, etc.

In some embodiments, the wireless communication device 102 can include a power source (e.g., an AC power source, a DC power source, etc.), which can be in electrical communication with one or more power outlets (e.g., AC or DC outlets) and/or one or more charging ports (e.g., for charging a battery pack of a power tool). Thus, in some cases, the wireless communication device 102 can be a portable power supply and/or a charging device for one or more power tools or other power tool devices. In some embodiments, the wireless communication device 102 can be implemented in other ways. For example, the wireless communication device 102 can be a cellular tower, a Wi-Fi® router, etc. In some embodiments, the wireless commination device 102 also serves as a wireless node (e.g., it performs the functions of both the wireless communication device 102 and a wireless node 110). Thus, regardless of the configuration, and as described below, the wireless communication device 102 can receive or determine tool device position data for the power tool device 104 and can transmit power tool device settings data to the power tool device 104.

The power tool device 104 may include an actuator, a power source (e.g., a battery pack), an electronic controller, a power source interface (e.g., a battery pack interface), etc. In some cases, the power tool system 100 can include a single power tool device 104. In other instances, more than one power tool device 104 can be used, in which case the power tool devices may be the same type of power tool device, or different types of power tool devices. For example, the power tool device 104 (or additional power tool devices) can be an impact wrench, an impact driver, a power drill, a hammer drill, a pipe cutter, a sander, a nailer, a grease gun, a crimper, a reciprocating saw, a circular saw, or any other suitable power tool. The power tool device 104 may also include an outdoor power equipment (OPE) power tool, such as a pruning shears, a hedge trimmer, a chainsaw, a blower, a sprayer, a string trimmer, a brush cutter, a lawn mower, or the like.

Additionally or alternatively, the power tool device 104 may include other power tool devices whose operation may be adjusted based on their position relative to a work object. For example, the power tool device 104 may additionally or alternatively include a power tool battery charger, a battery pack, a work light, a power tool pack adapter, as well as other devices used in conjunction with the power tool battery chargers, battery packs, and/or power tools. For instance, the power tool device 104 may include other related jobsite powered devices, such as powered coolers, lights, fans, robotics for cleaning, dust mitigation systems, safety hazard systems (e.g., alert lights, warning signs, etc.), blowers, vacuums, electronics (including computers, tablets, phones, etc., intended for the jobsite), powered hubs, gateway devices, smart mats, security cameras, charging strips, extension cords, spider boxes, radios, etc. As one non-limiting example, the power tool device 104 may be a battery pack, and the adjustable power tool device setting may be a current setting for the battery pack, such that a higher current is drawn from the battery pack to provide more power to a connected power tool when the battery pack is moved to a particular work location on or around the work object 112.

Regardless of the configuration, the power tool device 104 can be configured to communicate directly, or indirectly, with the wireless communication device 102 and/or wireless nodes 110. In some configurations, the power tool device 104 can directly communicate with the wireless communication device 102 according to a wireless communication protocol, which can be a Bluetooth® wireless protocol, a Zigbee® wireless protocol, a Wi-Fi® wireless protocol, or the like.

In some embodiments, the power tool device 104 can include a power tool device identifier associated therewith, which uniquely identifies the respective power tool device and power tool device type. For example, the power tool device identifier can be a media access control ("MAC") address, other unique identification information, etc.

In some cases, the power tool system 100 can include a network 106 and a server 108. Generally, the wireless communication device 102 can communicate with the server 108 via the network 106. More particularly, the wireless communication device 102 can communicate with an access point of the network 106 to communicate with the server 108 over the network 106. An access point can include, for example, a cellular tower or a Wi-Fi router. Additionally, the wireless communication device 102 can serve as a gateway device to enable a power tool device to communicate with the server 108 (again, via the network 106).

In some instances, the one or more wireless nodes 110 may be similar in construction to the wireless communication device 102. Alternatively, each wireless node 110 may be a different device that enables wireless communication between two or more devices. In some cases, each of these wireless nodes 110 can include a power source, an antenna, a receiver, an electronic controller, etc., and each of these can be configured to communicate according to a Bluetooth® wireless protocol, a Zigbee® wireless protocol, a Wi-Fi protocol, or the like. In some configurations, the mesh network can be a Bluetooth® mesh network, a Zigbee® mesh network, or the like.

In some embodiments, each wireless node 110 and the wireless communication device 102 can establish a mesh network, with some (or all) of the wireless nodes 110. In this way, information (including power tool device position data) can be disseminated through the mesh network, ultimately being received by the wireless communication device 102. Thus, even if the power tool device 104 exceeds the direct communication range of the wireless communication device 102 (e.g., being positioned at locations too far from the wireless communication device 102 and thus unable to directly communicate with the wireless communication device 102), the wireless nodes 110 of the power tool system 100 can act as nodes to establish indirect communication with the power tool device 104. As such, power tool device position data indicating the position of the power tool device 104, regardless of its location relative to the wireless communication device 102, can ultimately be received or determined by the wireless communication device 102.

The particular number, types, and locations of components with the power tool system 100 of FIG. 1 are merely used as an example for discussion purposes, and thus additional or different types of power tool devices 104, networks 106, servers 108, wireless nodes 110, work objects 112, and/or cameras 114, can be present in other embodiments of the power tool system 100.

In some embodiments, the wireless communication device 102 and/or server 108 can store various types of data to be retrieved by the power tool system 100. These data can be stored in a database, a memory, or other data storage medium or device of the wireless communication device 102 and/or server 108.

The wireless communication device 102 and/or server 108 can store power tool device data for various power tool devices (e.g., the power tool device(s) of the power tool system 100) including power tool device setting data for the power tool devices (e.g., to configure operating parameters of the power tool device), usage data for the power tool devices (e.g., number of hours of available operation for a power tool device), maintenance data for the power tool devices (e.g. a log of prior maintenance, suggestions for future maintenance, etc.), operator (and owner information) for the power tool devices, location data for the power tool devices (e.g., for inventory management and tracking), among other data. In some cases, the power tool device 104 of the power tool system 100 can periodically or occasionally attempt to communicate one or more types of power tool device data back to the wireless communication device 102 and/or server 108, or to otherwise communicate with the wireless communication device 102, server 108, or wireless nodes 110 of the power tool system 100.

Additionally, the wireless communication device 102 and/or server 108 can store work object data for various work objects, such as vehicles, heavy equipment, machine tools, etc. For example, the work object data can include work object type data, which identify the type of work object (e.g., the type of vehicle, the make and model of vehicle). The work object data can also include work location data, which identify work locations on one or more work objects (e.g., on the work object 112) where a power tool device action is to be performed, such as locations where work with the power tool device 104 is frequent to happen for each particular work object (e.g., including the work object 112). For example, the work location data can indicate frequent work locations for the work object 112, such as locations of lug nuts on a vehicle, locations of oil bolts on a vehicle, and the like.

Additionally or alternatively, the work location data can indicate frequent or planned work locations in other settings, such as locations in a landscape or other outdoor environment where OPE power tools may be frequently used, or where a particular action may be performed. In these instances, the work location data may include map data, GNSS data, or the like, which may indicate the locations of work objects such as particular plants or other landscape features.

For example, the power tool device 104 may include a handheld sprayer containing one or more solutions (e.g., in one or more tanks) to be sprayed or otherwise applied in a landscape or other outdoor environment. Examples of solutions that may be contained in such a handheld sprayer may include fertilizers, pest control solutions, and the like. In these instances, the work location data may include locations in a landscape or other outdoor environment where one or more solutions are to be sprayed or otherwise applied. The work object data can include different landscape or outdoor environment objects, such as particular plants or other landscape features. One or more operating parameters of the handheld sprayer may be adjusted when the handheld sprayer is near a particular work object. For example, the operating parameters may include a pressure setting for the handheld sprayer (e.g., a pressure setting between 20-80 PSI) to be used at a work location, a volume of solution to be applied to a particular work object, a type of solution to be applied to a particular work object, and so on.

As another example, the power tool device 104 may include a string trimmer or brush cutter. In these instances, the adjustable operating parameter may include a torque or other speed setting. When the string trimmer or brush cutter is moved to an area of denser grass or brush, as indicated in the work location data, the torque or speed setting may be automatically adjusted to facilitate more efficient removal of that denser brush. In this way, a user can move through a particular landscape or outdoor environment to perform a variety of brush removal tasks without having to manually adjust the power tool device settings between different brush removal tasks, which can lead to a more efficient utilization of battery power.

Figure 2:
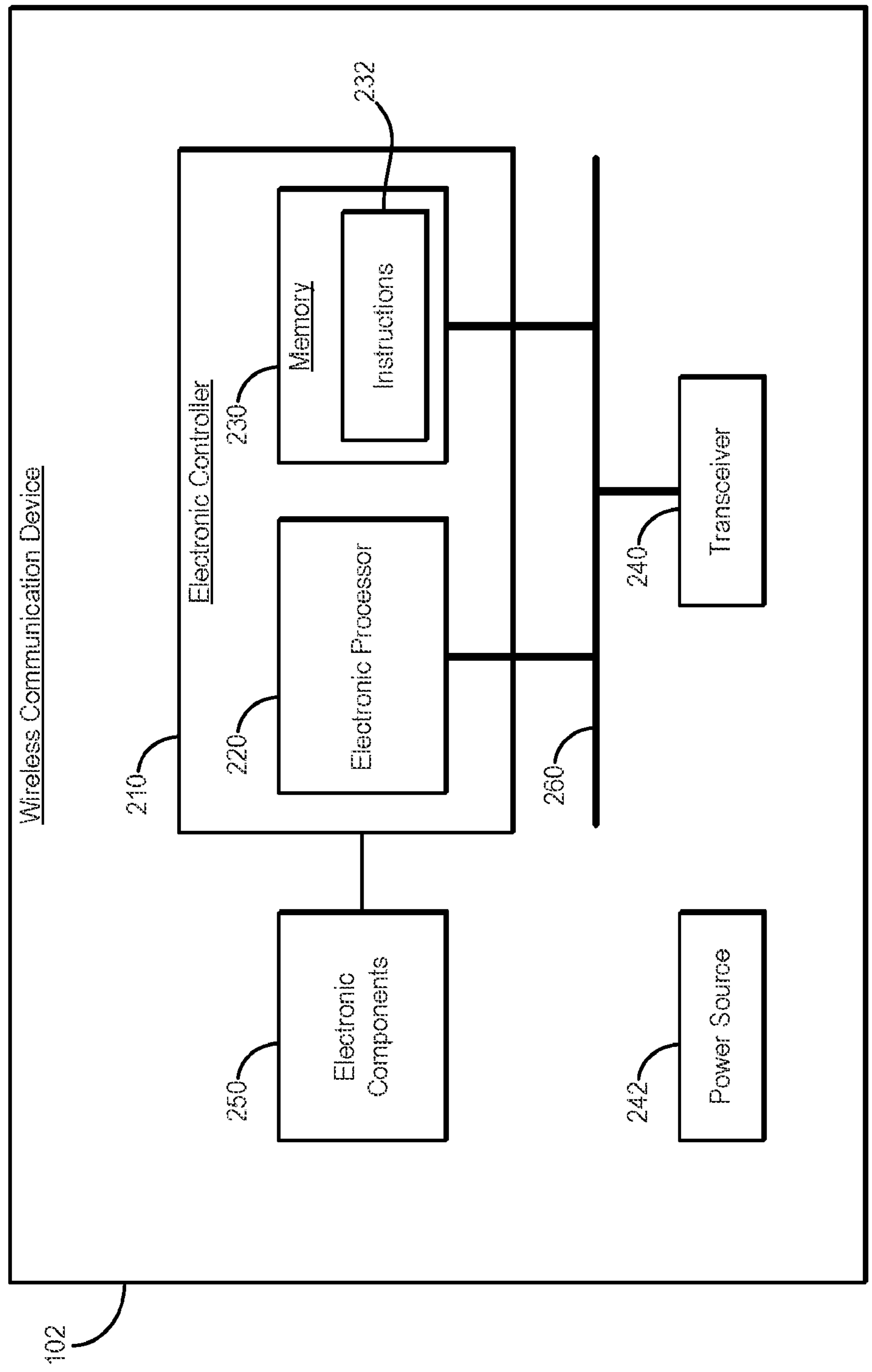
FIG. 2 shows a block diagram an example wireless communication device.

FIG. 2 shows a block diagram of a wireless communication device 102. The wireless communication device 102 can include an electronic controller 210, an transceiver 240, a power source 242, and electronic components 250.

The electronic controller 210 can include an electronic processor 220 and a memory 230. The electronic processor 220, the memory 230, and the transceiver 240 can communicate over one or more control buses, data buses, etc., which can include a device communication bus 260. The electronic processor 220 can be configured to communicate with the memory 230 to store data and retrieve stored data. The electronic processor 220 can be configured to receive instructions and data from the memory 230 and execute, among other things, the instructions. In particular, the electronic processor 220 executes instructions stored in the memory 230. Thus, the electronic controller 210 coupled with the electronic processor 220 and the memory 230 can be configured to perform the methods described herein (e.g., the process 400 of FIG. 4).

The memory 230 can include read-only memory ("ROM"), random access memory ("RAM"), other non-transitory computer-readable media, or a combination thereof. The memory 230) can include instructions 232 for the electronic processor 220 to execute. The instructions 232 can include software executable by the electronic processor 220 to enable the electronic controller 210 to, among other things, determine or receive work object data of the work object 112; determine or receive work object position data of the work object 112; determine, select, and/or receive work location data for the work object 112; determine or receive power tool device position data of the power tool device 104; and determine, select, and/or transmit power tool device settings data to the power tool device 104. In some embodiments, some or all of the above-described functionality of the wireless communication device 102 is incorporated into the server 108, with the wireless communication device 102, wireless nodes 110, and/or network 106 providing a communicative coupling between the server 108 and the power tool device 104. For example, a portion of the instructions 232 may be incorporated into a memory of the server 108, which may be executed by a processor of the server 108. For example, in some embodiments, through execution of these instructions, the server 108 is configured to, among other things, determine or receive work object data of the work object 112; determine or receive work object position data of the work object 112; determine, select, and/or receive work location data for the work object 112; determine or receive power tool device position data of the power tool device 104; and determine, select, and/or transmit power tool device settings data to the power tool device 104.

The transceiver 240 can be communicatively coupled to the electronic controller 210. The transceiver 240 enables the electronic controller 210 (and, thus, the wireless communication device 102) to communicate with other devices, such as a cellular tower, a Wi-Fi® router, a mobile device, power tool devices, wireless nodes, access points, etc. In some examples, the transceiver 240 can further include a GNSS receiver configured to receive signals from GNSS satellites, land-based transmitters, etc. The transceiver 240 may include a driver circuit and an antenna. A driver circuit may receive signals to be transmitted from the electronic controller 210 over a wired connection and can drive the antenna to transmit the signals as wireless signals according to its associated communication protocol, and/or may receive wireless signals from external devices via the antenna and provide the received signals to the electronic controller 210 via a wired connection. In some examples, the transceiver 240 may include multiple transceivers, each associated with a particular communication protocol. Each such transceiver may include a driver circuit and an antenna. In some cases, two or more transceivers may share use of an antenna for transmitting and/or receiving wireless signals.

In some embodiments, the wireless communication device 102 can include electronic components 250, which can include amplifiers, a display (e.g., an LCD display, a touch screen display), inputs (e.g., a keypad, a touch screen, a key board, a mouse, etc.), outputs, etc. In some embodiments, the power source 242 can be a battery, an electrical cable, etc.

Figure 3:
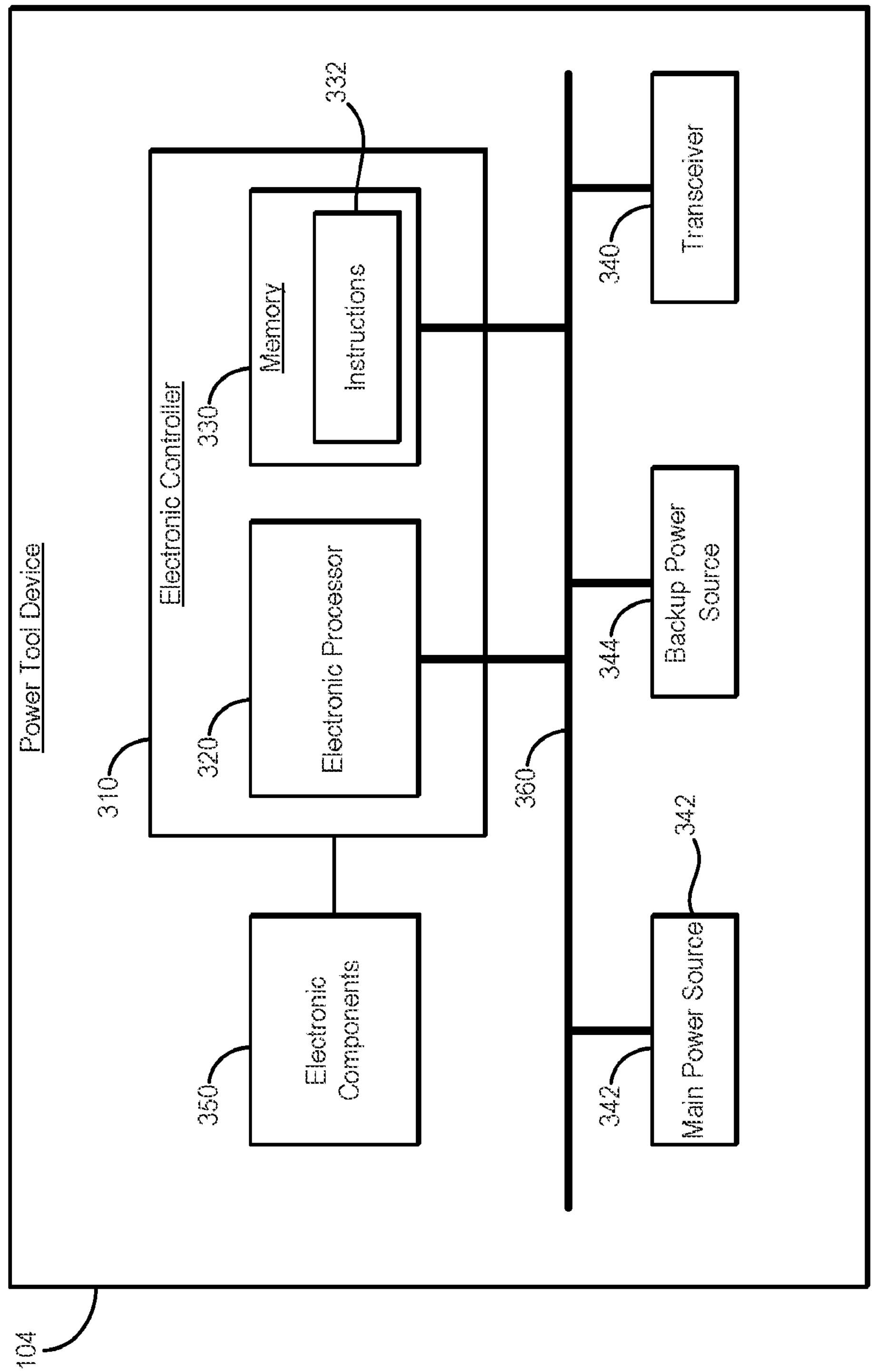
FIG. 3 shows a block diagram of an example power tool device.

FIG. 3 shows a block diagram an example of a power tool device 104. In the example illustrated, the power tool device 104 can include an electronic controller 310, an transceiver 340, electronic components 350, etc. In some embodiments, the electronic controller 310 can be similar to the electronic controller 210, and the transceiver 340 can be similar to the transceiver 240. For example, the electronic controller 310 can include an electronic processor 320 and memory 330. The electronic processor 320, the memory 330, and the transceiver 340) can communicate over one or more control buses, data buses, etc., which can include a device communication bus 360. The electronic processor 320 can be configured to communicate with the memory 330 to store data and retrieve stored data. The electronic processor 320 can be configured to receive instructions and data from the memory 330 and execute, among other things, the instructions. In particular, the electronic processor 320 executes instructions stored in the memory 330. Thus, the electronic controller 310 coupled with the electronic processor 320 and the memory 330 can be configured to perform the methods described herein (e.g., the process 500 of FIG. 5).

The memory 330 can include ROM, RAM, other non-transitory computer-readable media, or a combination thereof. The memory 330) can include instructions 332 for the electronic processor 320 to execute. The instructions 332 can include software executable by the electronic processor 320 to enable the electronic controller 310 to, among other things, determine and/or transmit power tool device position data of the power tool device 104; and adjust operating parameters of the power tool device 104 in response to power tool device settings data.

The transceiver 340 can be communicatively coupled to the electronic controller 310. The transceiver 340) enables the electronic controller 310 (and, thus, the power tool device 104) to communicate with other devices, such as the wireless communication device 102, wireless nodes 110, a cellular tower, a Wi-Fi router, a mobile device, other power tool devices, access points, etc. In some examples, the transceiver 340 can further include a GNSS receiver configured to receive signals from GNSS satellites, land-based transmitters, etc. The transceiver 340 may include a driver circuit and an antenna. A driver circuit may receive signals to be transmitted from the electronic controller 310 over a wired connection and can drive the antenna to transmit the signals as wireless signals according to its associated communication protocol, and/or may receive wireless signals from external devices via the antenna and provide the received signals to the electronic controller 310 via a wired connection. In some examples, the transceiver 340 may include multiple transceivers, each associated with a particular communication protocol. Each such transceiver may include a driver circuit and an antenna. In some cases, two or more transceivers may share use of an antenna for transmitting and/or receiving wireless signals.

In some embodiments, the power tool device 104 also optionally includes a main power source 342 (e.g., a battery pack, a portable power supply, and/or a wall outlet), etc. Additionally, the power tool device 104 may also include a backup power source 354 (e.g., a coil cell battery).

For instance, in some embodiments the main power source 342 can include a power tool battery pack interface that is configured to selectively receive and interface with a power tool battery pack. The pack interface can include one or more power terminals and, in some cases, one or more communication terminals that interface with respective power terminals, communication terminals, etc., of the power tool battery pack. The power tool battery pack can include one or more battery cells of various chemistries, such as lithium-ion (Li-Ion), nickel cadmium (Ni-Cad), etc. The power tool battery pack can further selectively latch and unlatch (e.g., with a spring-biased latching mechanism) to the power tool device 104 to prevent unintentional detachment. The power tool battery pack can further include a pack electronic controller (pack controller) including a processor and a memory. The pack controller can be configured similarly to the electronic controller 310 of the power tool device 104. The pack controller can be configured to regulate charging and discharging of the battery cells, and/or to communicate with the electronic controller 310. In some embodiments, the power tool battery pack can further include an antenna, similar to the transceiver 340, coupled to the pack controller via a bus similar to bus 360. Accordingly, the pack controller, and thus the power tool battery pack, can be configured to communicate with other devices, such as the wireless communication device 102, the power tool device 104 or other power tool devices, the wireless nodes 110, a cellular tower, a Wi-Fi® router, a mobile device, access points, etc. In some embodiments, the memory of the pack controller can include the instructions 332. The power tool battery pack can further include, for example, a charge level fuel gauge, analog front ends, sensors, etc.

The main power source 342 can be coupled to and configured to power the various components of the power tool device 104, such as the electronic controller 310, the transceiver 340, and the electronic components 350. However, to simplify the illustration, power line connections between the main power source 342 and these components are not illustrated.

In some embodiments, the power tool device 104 also optionally includes additional electronic components 350. For a motorized power tool (e.g., drill-driver, saw; etc.), the electronic components 350 can include, for example, an inverter bridge, a motor (e.g., brushed or brushless) for driving a tool implement, etc. For a non-motorized power tool (e.g., a work light, a work radio, ruggedized tracking device, etc.), the electronic components 350 can include, for example, one or more of a lighting element (e.g., an LED), an audio element (e.g., a speaker), a power source, etc. In the case of the power tool battery pack implementation, the electronic component 350 can include, for example, one or more battery cells, a charge level fuel gauge, analog front ends, sensors, etc.

In some embodiments, the transceiver 340 can be within a separate housing along with the electronic controller 310 or another electronic controller, and that separate housing selectively attaches to the power tool device 104. For example, the separate housing may attach to an outside surface of the power tool device 104 or may be inserted into a receptacle of the power tool device 104. Accordingly, the wireless communication capabilities of the power tool device 104 can reside in part on a selectively attachable communication device, rather than integrated into the power tool device 104. Such selectively attachable communication devices can include electrical terminals that engage with reciprocal electrical terminals of the power tool device 104 to enable communication between the respective devices and enable the power tool device 104 to provide power to the selectively attachable communication device. In other embodiments, the transceiver 340 can be integrated into the power tool device 104.

Figure 4:
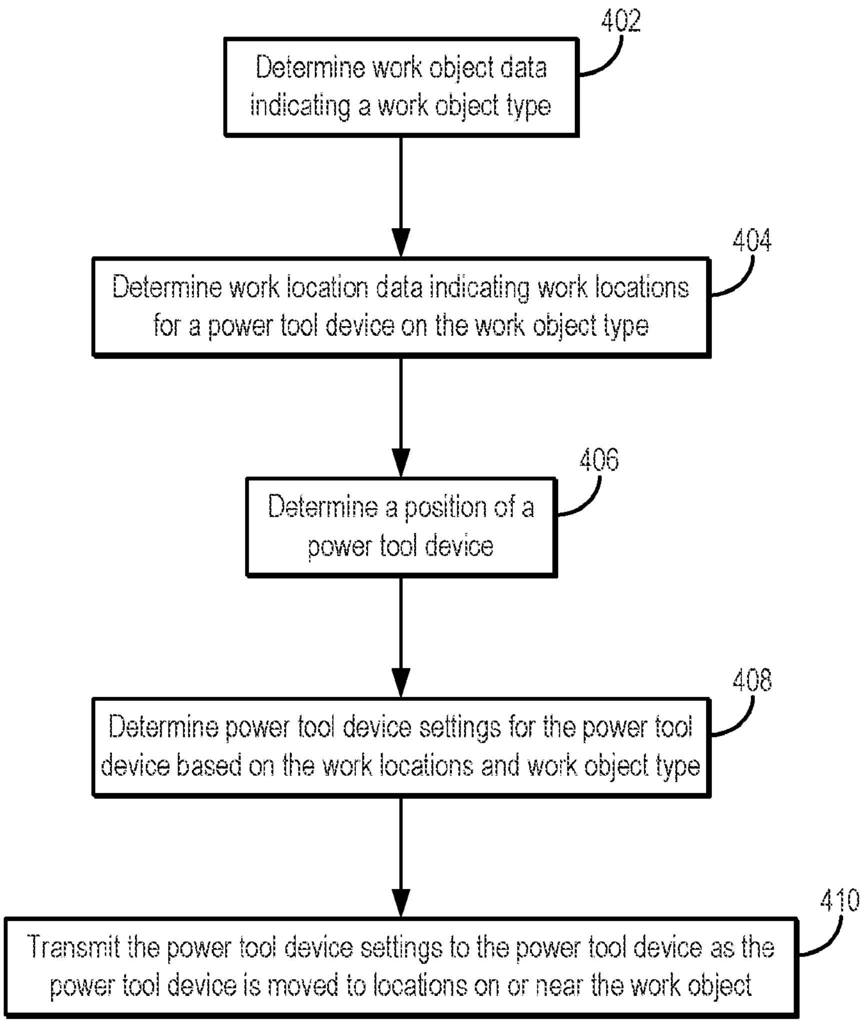
FIG. 4 shows a flowchart of a process for automatically adjusting one or more settings of a power tool device based on a location of the power tool device relative to a work object.

FIG. 4 illustrates a flowchart of a process 400 for automatically adjusting one or more settings of a power tool devices based on a location of the power tool device relative to a work object (e.g., a vehicle being serviced), which can be implemented using any of the systems described herein (e.g., the power tool system 100). However, in some embodiments, the process 400 is implemented by another system having additional components, fewer components, alternative components, etc. In some specific cases, the process 400 can be implemented using a wireless communication device (e.g., the wireless communication device 102). Additionally, although the blocks of the process 400 are illustrated in a particular order, in some embodiments, one or more of the blocks can be executed partially or entirely in parallel, can be executed in a different order than illustrated in FIG. 4, or can be bypassed. For illustration purposes, the process 400 is generally described as being implemented by the wireless communication device 102 in the context of the power tool system 100 in FIG. 1. However, in other embodiments, other power tool devices or devices of the power tool system 100, or other power tool devices or devices of other systems, may implement the process 400.

In block 402, the process 400 can include determining work object data of a work object (e.g., the work object 112) located at a jobsite. For example, the wireless communication device 102 can identify the type of work object and retrieve the work object data corresponding to that work object type from a memory (e.g., memory 230) of the wireless communication device, a memory of the server 108) or other database and/or data storage device or medium in communication with the wireless communication device 102.

The wireless communication device 102 can identify the type of work object in various different ways. For instance, camera(s) 114 can record one or more images of the work object 112 and the wireless communication device 102 can receive and process the image(s) (e.g., using the electronic processor 220 of the wireless communication device 102) to identify the type of work object. As an example, the electronic processor 220 of the wireless communication device 102 can implement a computer vision algorithm or other classifier algorithm to identify the type of work object from the image(s). The one or more images can be applied to the computer vision algorithm or other classifier algorithm, generating output as work object type data that indicate the type of work object recorded by the camera(s).

For instance, a computer vision algorithm or other classifier algorithm can be implemented to determine features in the image(s) that are associated with the work object 112, and which can be used to classify the type of work objects. As an example, the features extracted from the image(s) may include a size of the work object 112, a shape of the work object 112, or other features from the image(s) such as edges, corners, interest points, blobs, region-of-interest points, and/or ridges. Other classifier algorithms can include machine learning algorithms, including support vector machine ("SVM") and neural network (e.g., convolutional neural network) based machine learning algorithms. Such machine learning algorithms can be trained on training data to detect, identify, and/or classify certain objects depicted in a recorded image. For example, a neural network can be trained on training data that includes a series of images containing the types of work objects to be detected (e.g., types of cars, types of fasteners, types of cable crimps, wood grain patterns, types of plants, etc.) for a particular task, and may additionally include images of other objects not consistent with the types of work objects to be detected for that particular task. In this way, the neural network can be trained to identify the particular work object of interest relative to other objects that are not consistent with the work object. Different neural networks can thus be trained to detect different types of work objects.

In some embodiments, the type of work object can be determined by scanning or otherwise detecting a work object identifier on the work object 112. For instance, a barcode, quick response ("QR") code, or other identifier on the work object 112 can be scanned by a scanner (e.g., via one of the cameras 114 or another scanning device of the wireless communication device 102). The wireless communication device 102 can generate work object type data in response to detecting the work object identifier, such as by recording the work object identifier, querying a database of work object types stored in the memory 230, and retrieving and outputting the work object type data corresponding to the work object associated with the work object identifier. As an example, the work object 112 may be a vehicle and the work object identifier may be a vehicle identification number ("VIN"). By scanning or otherwise detecting the VIN, the wireless communication device 102 can retrieve the corresponding work object type data, which may include the make and model of the vehicle, the dimensions of the vehicle, and so on. In still other embodiments, the type of work object can be determined by a user selecting a work object type from a list stored in the memory 230 of the wireless communication device 102. Additionally or alternatively, the server 108 can identify the type of work object using the methods described above (e.g., using an electronic processor and/or memory of the server 108). In still other examples, the type of work object can be determined based on predetermined knowledge about the work site. For instance, where the worksite is a landscape or other outdoor environment where the locations of work objects (e.g., plants, other landscape features, other outdoor fixtures) may be known and fixed, the types of work objects can be associated with those known fixed locations.

In block 404, the process can include determining work location data indicating one or more work locations on the work object 112 where a power tool device action is to be performed (e.g., frequent locations where a power tool device action is performed on the particular type of work object). For example, the wireless communication device 102 can use the work object type data to query a database (e.g. stored on the memory 230 or a memory of the server 108) and retrieve or otherwise access the work location data in response.

In some embodiments, the work location data can be stored as relative positions (e.g., positions relative to a common reference point on the work object 112), and in some instances may be updated in real-time by the power tool system 100 (e.g., the wireless communication device 102, the power tool device 104, the server 108, or one of the wireless nodes 110) if a different reference point on the work object 112 is selected by a user (e.g., by recording a new reference location on the work object 112 or relative to a measured location of the work object 112). The work locations can be updated, as necessary, by updating the reference point of the work object 112, determining a separation between the original and new reference point and updating the relative positions of the work locations accordingly. The position of the work object 112 can, therefore, be known or otherwise determined relative to the wireless communication device 102 and/or wireless nodes 110 such that the work locations contained in the work location data can be determined within the frame of reference of the power tool system 100. For example, the position of the work object 112 can be recorded using the camera(s) 114 of the power tool system 100. Alternatively, the power tool device 104 can be used to record the position of the work object 112. For example, the power tool device 104 can be moved to a position on or near the work object 112 and then the position of the power tool device 104 can be recorded as the reference location for the work object 112 (e.g., using the power tool device position tracking methods described below). Additionally or alternatively, the server 108 can determine and/or update the work location data using the methods described above (e.g., using an electronic processor and/or memory of the server 108).

In block 406, the process can include determining a position of the power tool device 104. In some embodiments, the position of the power tool device 104 can be determined by the power tool system 100 (e.g., using the electronic processor 220 of the wireless communication device 102, the electronic processor 320 of the power tool device 104, or an electronic processor of the server 108 or one of the wireless nodes 110), generating output as power tool device position data. The power tool device position data may be communicated or otherwise transmitted to the wireless communication device 102, whether directly or indirectly via one or more wireless nodes 110. The position of the power tool device 104 can be determined within a frame of reference defined by or otherwise based on the locations of the wireless communication device 102 and/or wireless nodes 110.

The power tool system 100 may use various tracking techniques to determine the position of the power tool device 104. For example, the location of the wireless communication device 102 and each wireless node 110 may be fixed and stored in the power tool system 100 (e.g., in the memory 230 of the wireless communication device 102, the memory 330 of the power tool device 104, a memory of the server 108, a memory of each wireless node 110); may be periodically determined (e.g., based on a GNSS receiver integrated into the wireless communication device 102, the power tool device 104, and/or each wireless node 110) and stored in the power tool system 100, or some combination thereof. Further, the wireless communication device 102 and each wireless node 110 may communicate with the power tool device 104 and, based on a measurement of the communications, triangulate a location of the power tool device 104. Measurements of communications may include, for example, strength-of-signal measurements, time-of-flight measurements, or a combination thereof.

More particularly, in some examples, the wireless communication device 102 and some or all of the wireless nodes 110 may measure a strength-of-signal of a communication from the power tool device 104, and the strength-of-signal measurements may correspond to a respective distance between the power tool device 104 and the wireless communication device 102 and/or wireless node(s) 110. Based on these distances, the power tool system 100 (e.g., the wireless communication device 102, the power tool device 104, the server 108, or one of the wireless nodes 110) can calculate a location of the power tool device 104 relative to the known locations of the wireless communication device 102 and wireless node(s) 110 (e.g., using triangulation techniques).

In another example, the power tool device 104 may measure a strength-of-signal of a communication from the wireless communication device 102 and some or all of the wireless nodes 110, and the strength-of-signal measurements may again correspond to a distance between the power tool device 104 and each of the wireless communication device 102 and wireless node(s) 110. Based on these distances, the power tool system 100 (e.g., the wireless communication device 102, the power tool device 104, the server 108, or one of the wireless nodes 110) can calculate a location of the power tool device 104 relative to the known locations of the wireless communication device 102 and wireless node(s) 110.

In another example, wireless communication device 102, the power tool device 104, and/or wireless nodes 110 may measure a time-of-flight of a communication from the power tool device 104 and each of the wireless communication device 102 and wireless node(s) 110, or from each of the wireless communication device 102 and wireless node(s) 110 to the power tool device 104. Again, the time-of-flight measurement may correspond to a distance between the power tool device 104 and each of the wireless communication device 102 and wireless node(s). Based on these distances, the power tool system 100 (e.g., the wireless communication device 102, the power tool device 104, the server 108, or one of the wireless nodes 110) can calculate a location of the power tool device 104 relative to the known locations of the wireless communication device 102 and wireless node(s) 110.

The communications between the power tool device 104 and the wireless communication device 102 and/or wireless node(s) 110 may be unidirectional or bi-directional. In some examples, the communications may be, for example, Bluetooth® communications, ultra-wide band ("UWB") communications, or communications sent according to another protocol.

In block 408, the process can include determining one or more power tool device settings for the power tool device 104 based on the determined position of the power tool device 104 relative to the work locations on the work object 112. For example, the wireless communication device 102 (e.g., using the electronic processor 220) can track the position of the power tool device 104 relative to the work locations on the work object 112 by comparing the power tool device position data with the work location data stored on the wireless communication device 102. When tracking the position of the power tool device 104 determines that the power tool device 104 is near to a work location identified in the work location data (e.g., by comparing whether the power tool device position data indicate that the power tool device 104 is within a threshold distance from one of the work locations contained in the work location data) then the wireless communication device 102 can retrieve or otherwise access power tool device settings data corresponding to the power tool device type and work location on the work object 112. For example, in some embodiments, the electronic processor 220 determines the work location nearest to the power tool device position (e.g., by calculating a distance between the power tool device position and each work location of the work location data, and comparing the distances to detect the nearest work location). The electronic processor 220 may then determine the power tool device setting corresponding to the power tool device action to be performed at this nearest work location. Additionally or alternatively, the server 108 can determine the power tool device setting data using the methods described above (e.g., using an electronic processor and/or memory of the server 108).

In block 410, the process can include transmitting the power tool device setting data to the power tool device 104, where the power tool setting data includes one or more operating parameters for the power tool device 104. The one or more operating parameters of the power tool device 104 can include an operating parameter of an actuator of the power tool device 104, a motor of the power tool device 104, or other component of the power tool device 104 (e.g., an electronic component 350 or other component of the power tool device 104). For example, the one or more operating parameters may include, for example, one or more of a torque setting (e.g., indicating a torque threshold at which the power tool device 104 should cease driving); a speed setting indicating a speed, a minimum speed, or a maximum speed at which the power tool device 104 implement (e.g., saw blade, drill bit, driver bit, hammer drill bit, crimp head, cutter head, nail driver) should operate (e.g., which may be indicated as a motor rotation speed); an anti-kickback threshold setting, a clamp force setting, a crimp force setting, nail driving force setting, rivet force setting, or the like. For example, the wireless communication device 102 and/or wireless nodes 110 can transmit the determined power tool device setting data to the power tool device 104 (e.g., via the transceiver 340 of the power tool device 104) when the power tool device position data indicate that the power tool device 104 has moved near to one of the work locations in the work location data (e.g., as determined by the electronic processor 220 of the wireless communication device 102, the electronic processor 320 of the power tool device 104, or an electronic processor of the server 108 or wireless node(s) 110). In some embodiments, in response to receipt of the power tool device setting data, the power tool device 104 adjusts one or more operating parameters of the power tool device 104 in accordance with the power tool device setting data.

In some embodiments, the wireless communication device 102 may loop back to block 406 to determine an updated position of the power tool device 104. The wireless communication device 102 may then proceed through blocks 408 and 410 to provide an updated power tool device setting data based on the updated position of the power tool device 104. The wireless communication device 102 may continue to loop back through blocks 406, 408, and 410 to continue to track the position of the power tool device 104 relative to the work object 112 and to provide associated power tool device setting data to the power tool device 104 as the power tool device 104 moves about the work object 112. This process may continue until the operator of the power tool device 104 ceases work on the work object 112 and/or a new work object is detected (and the process 400 may begin anew at block 402).

As one example, the work object 112 may be a vehicle and the work location data may contain work locations corresponding to the location of lug nuts on the wheels of the vehicle, an oil pan bolt on the vehicle, and the like. The corresponding power tool device settings data may then contain torque settings for an impact wrench, such that when the power tool device 104 is positioned near a work location corresponding to the oil pan bolt then the torque setting for the oil pan bolt can be selected, or similarly when the power tool device 104 is positioned near a work location corresponding to a lug nut on the wheel of the vehicle then the torque setting for the lug nut(s) can be selected.

Figure 5:
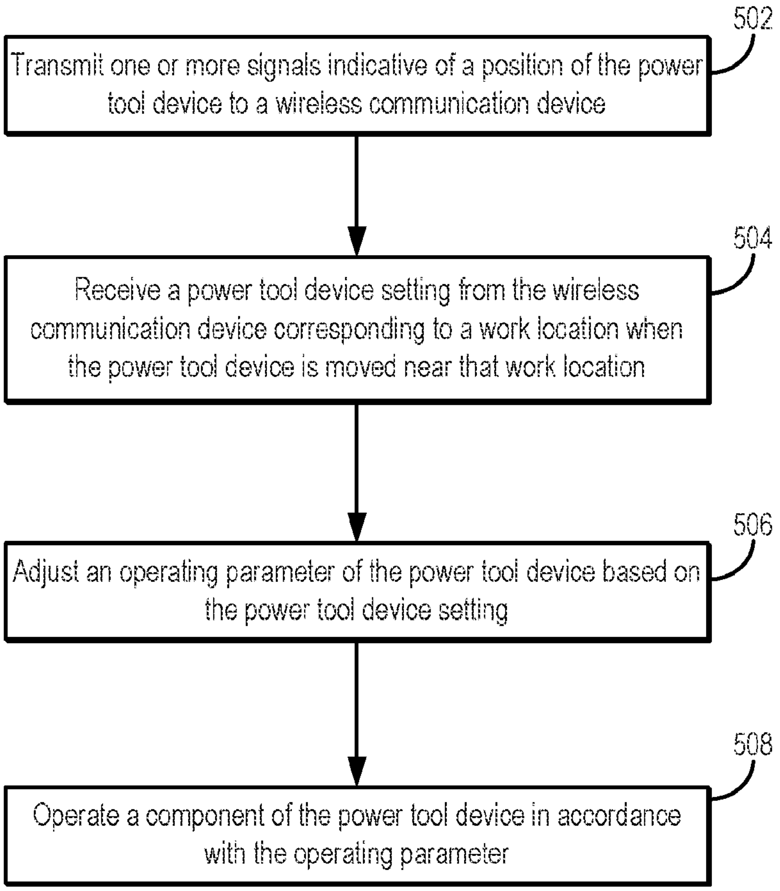
FIG. 5 shows a flowchart of a process for automatically adjusting one or more settings of a power tool device based on a location of the power tool device relative to a work object.

FIG. 5 illustrates a flowchart of a process 500 for automatically adjusting one or more settings of a power tool device based on a location of the power tool device relative to a work object (e.g., a vehicle being serviced), which can be implemented using any of the systems described herein (e.g., the power tool system 100). However, in some embodiments, the process 500 is implemented by another system having additional components, fewer components, alternative components, etc. In some specific cases, the process 500 can be implemented using a power tool device (e.g., the power tool device 104). Additionally, although the blocks of the process 500 are illustrated in a particular order, in some embodiments, one or more of the blocks can be executed partially or entirely in parallel, can be executed in a different order than illustrated in FIG. 5, or can be bypassed. For illustration purposes, the process 500 is generally described as being implemented by the power tool device 104 in the context of the power tool system 100 in FIG. 1. However, in other embodiments, other power tool devices or devices of the power tool system 100, or other power tool devices or devices of other systems, may implement the process 500.

In block 502, the power tool device 104 (e.g., the processor 320) transmits, via the transceiver 340, one or more signals indicative of a position of the power tool device 104 to the wireless communication device 102. For example, the power tool device 104 may determine the position of the power tool device 104 (as described above with respect to block 406) and transmit the position (as part of the one or more signals) to the wireless communication device 102. As another example, the power tool device 104 may transmit one or more signals that are received by the wireless nodes 110 or other system 100 devices, from which the position of the power tool device 104 may be derived (e.g., as described above with respect to block 406). For example, the wireless nodes 110 may triangulate the position of the power tool device 104 based on strength-of-signal or time-of-flight measurements of the one or more signals. As another example, the power tool device 104 may measure strength-of-signal or time-of-flight of signals received from the wireless nodes 110, and may indicate these measurements in the one or more signals transmitted to the wireless communication device 102. The wireless communication device 102 may, in turn, triangulate the position of the power tool device 104 based on this measurement information. As yet another example, the signals indicative of a position of the power tool device 104 may include GNSS signals.

In block 504, the power tool device 104 (e.g., the processor 320) receives, via the transceiver 340, a power tool device setting from the wireless communication device 102. The power tool device setting corresponds to a power tool device action to be performed at a work location nearest to the power tool device position. For example, the wireless communication device 102 may transmit the power tool device setting to the power tool device 104 as described above with respect to block 410 of FIG. 4, where the power tool device setting is based on the position of the power tool device 104 and the work location data for a work object (e.g., the work object 112).

In block 506, the power tool device 104 adjusts an operating parameter of the power tool device 104 based on the power tool device setting data received by the power tool device 104. For example, the processor 320 may update a variable stored in a memory (e.g., register) of the processor 320 or the memory 330 that indicates the operating parameter.

In block 508, a component of the power tool device 104 operates in accordance with the operating parameter. For example, the processor 320 may detect actuation of an input device of the power tool device 104 (e.g., depression of a trigger or button by a user), and then drive a motor or other actuator of the power tool device 104 according to the operating parameter (e.g., at a particular speed, at a particular force, or until a torque or force threshold is reached). As another example, the power tool device 104 may be a battery pack and the discharge current from the battery pack may be adjusted according to the operating parameter (e.g., at a higher current draw; at a lower current draw).

While the disclosure has been mainly framed around power tool devices, it is also contemplated that the embodiments of the disclosure can be applied also to power tool battery packs as also described above. For example, the power tool system 100 may include one or more power tool battery packs. As previously noted, the power tool battery pack can include a pack electronic controller (pack controller) configured to communicate with other devices. For example, the power tool battery pack may communicate with the wireless communication device 102, power tool device 104, and/or wireless nodes 110 of the power tool system 100. Accordingly, in some embodiments, the power tool battery pack may implement the process 400 of FIG. 4 (e.g., determining a position of the battery pack, receiving a battery pack setting, and adjusting an operating parameter of the battery pack). For example, the position of a power tool device 104 and/or its battery pack can be tracked as the power tool device 104 is moved around a work object 112. When the power tool device 104 and/or its battery pack are moved near a work location of the work object 112, the power tool device settings of the battery pack can be adjusted based on the stored power tool device settings corresponding to the work location. For instance, the discharge current from the battery pack can be adjusted based on the power tool device action to be performed at the work location (e.g., drawing a higher current when advantageous for the tool action to be performed).

It is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

In some embodiments, computerized implementations of methods according to the disclosure can be implemented as a system, method, apparatus, or article of manufacture using standard programming or engineering techniques to produce software, firmware, hardware, or any combination thereof to control a processor device (e.g., a serial or parallel processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the disclosure can be implemented as a set of instructions, tangibly embodied on a non-transitory computer-readable media, such that a processor device can implement the instructions based upon reading the instructions from the computer-readable media. Some embodiments of the disclosure can include (or utilize) a control device such as an automation device, a computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.). Also, functions performed by multiple components can be consolidated and performed by a single component. Similarly, the functions described herein as being performed by one component can be performed by multiple components in a distributed manner. Additionally, a component described as performing particular functionality can also perform additional functionality not described herein. For example, a device or structure that is "configured" in a certain way is configured in at least that way, but can also be configured in ways that are not listed.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk ("CD"), digital versatile disk ("DVD"), and so on), smart cards, and flash memory devices (e.g., card, stick, and so on). Additionally, it should be appreciated that a carrier wave can be employed to carry computer-readable electronic data such as those used in transmitting and receiving electronic mail or in accessing a network such as the Internet or a local area network ("LAN"). Those skilled in the art will recognize that many modifications can be made to these configurations without departing from the scope or spirit of the claimed subject matter.

Certain operations of methods according to the disclosure, or of systems executing those methods, can be represented schematically in the figures or otherwise discussed herein. Unless otherwise specified or limited, representation in the figures of particular operations in particular spatial order does not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular embodiments of the disclosure. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," etc. are intended to encompass part or all of computer-related systems that include hardware, software, a combination of hardware and software, or software in execution. For example, a component can be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) can reside within a process or thread of execution, can be localized on one computer, can be distributed between two or more computers or other processor devices, or can be included within another component (or system, module, and so on).

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

Various features and advantages of the disclosure are set forth in the following claims.

The invention claimed is:

1. A method for adjusting a power tool device setting of a power tool device based on a location of the power tool device relative to a work object, the method comprising:
- determining work object data that indicate a work object type for the work object;
- determining work location data based on the work object data, the work location data indicating a plurality of work locations on the work object where a power tool device action is to be performed;
- determining a power tool device position of the power tool device;
- determining a work location, from the plurality of work locations, that is nearest to the power tool device position by calculating a distance between the power tool device position and each work location of the plurality of work locations;
- determining, by an electronic controller, a power tool device setting corresponding to the power tool device action to be performed at the determined work location of the power tool device; and
- transmitting, by the electronic controller, the power tool device setting to the power tool device, wherein the power tool device setting indicates an operating parameter of the power tool device.

2. The method of claim 1, wherein determining the work object data comprises recording an image of the work object and processing the image to determine the work object type.

3. The method of claim 2, wherein processing the image to determine the work object type comprises applying the image to a computer vision algorithm using the electronic controller, and generating output as the work object data.

4. The method of claim 1, wherein determining the work object data comprises scanning an identifier on the work object, and generating output indicative of the identifier as the work object data.

5. The method of claim 4, wherein the identifier is a barcode.

6. The method of claim 5, wherein the barcode is a quick response (QR) code.

7. The method of claim 4, wherein the work object is a vehicle and the identifier is a vehicle identification number (VIN) of the vehicle.

8. The method of claim 1, wherein determining the work object data includes receiving, by the electronic controller, a user selection of the work object type from a list of work object types stored in a database.

9. The method of claim 1, wherein determining the power tool device position includes triangulating the power tool device relative to a plurality of wireless nodes.

10. The method of claim 9, wherein determining the power tool device position includes triangulating the power tool device using one of a strength-of-signal or time-of-flight of communications between the power tool device and the plurality of wireless nodes.

11. The method of claim 1, wherein the work object is a vehicle and the work object data indicate a make and model of the vehicle.

12. The method of claim 11, wherein the work location data indicate locations of lug nuts on the vehicle and the power tool device setting includes a torque setting for an impact wrench.

13. The method of claim 12, wherein the work location data further indicate a location of an oil pan bolt on the vehicle and the power tool device setting includes a further torque setting for the impact wrench to drive the oil pan bolt.

14. The method of claim 1, wherein the power tool device is a power tool.

15. The method of claim 1, wherein the power tool device is a battery pack.

16. The method of claim 1, wherein the power tool device comprises an outdoor power equipment (OPE) power tool device.

17. The method of claim 16, wherein the power tool device position of the power tool device is determined based on global navigation satellite system (GNSS) signals transmitted by the power tool device.

18. A wireless communication device, comprising:
- a transceiver;
- an electronic controller in communication with the transceiver, the electronic controller including a processor and a memory;

wherein the memory has stored thereon:

work location data indicating a plurality of work locations on each type of work object where a power tool device action is to be performed; and power tool device setting data indicating a power tool device setting for each work location in the work location data; and wherein the processor is configured to:

determine work object data that indicate a work object type for a work object located at a jobsite;

retrieve the work location data stored in the memory corresponding to the type of work object indicated in the work object data;

retrieve power tool device setting data stored in the memory corresponding to the work locations indicated in the work location data retrieved by the processor; and determine a power tool device position of a power tool device located at the jobsite;

determine a work location, from the plurality of work locations, that is nearest to the power tool device position by calculating a distance between the power tool device position and each work location of the plurality of work locations; and transmit to the power tool device, by the transceiver, a power tool device setting corresponding to the power tool device action to be performed at the determined work location of the power tool device.

19. The wireless communication device of claim 18, wherein the processor is configured to determine the work object data by receiving, via the transceiver, an image of the work object and processing the image to determine the work object type.

20. The wireless communication device of claim 19, wherein processing the image to determine the work object type comprises applying the image to a computer vision algorithm using the electronic controller, and generating output as the work object data.

21. The wireless communication device of claim 18, wherein the processor is configured to determine the work object data by receiving, via the electronic controller, a user selection of the work object type from a list of work object types stored in a database.

22. A power tool, comprising:

a body;

an actuator coupled to the body;

a transceiver coupled to the body; and an electronic controller coupled to the body and in communication with the transceiver, the electronic controller including a processor and configured to:

transmit, via the transceiver, one or more signals indicative of a position of the power tool to a wireless communication device;

receive, via the transceiver, a power tool device setting from the wireless communication device, the power tool device setting corresponding to a work location that is nearest to the position of the power tool, wherein the work location is determined by comparing the position of the power tool to each work location of a plurality of work locations;

adjust an operating parameter of the power tool based on the power tool device setting; and operate the actuator in accordance with the operating parameter.

* * * * *